US011799344B2

(12) United States Patent
Neet et al.

(10) Patent No.: US 11,799,344 B2
(45) Date of Patent: Oct. 24, 2023

(54) STATOR WITH INTERNAL CONNECTIONS FOR WINDING LEADS

(71) Applicant: BorgWarner Inc., Auburn Hills, MI (US)

(72) Inventors: Kirk Neet, Noblesville, IN (US); Matt Ryan Conner, Franklin, IN (US)

(73) Assignee: BorgWarner Inc., Auburn Hills, MI (US)

( * ) Notice: Subject to any disclaimer, the term of this patent is extended or adjusted under 35 U.S.C. 154(b) by 58 days.

(21) Appl. No.: 17/318,636

(22) Filed: May 12, 2021

(65) Prior Publication Data

US 2021/0359567 A1 Nov. 18, 2021

Related U.S. Application Data

(60) Provisional application No. 63/023,800, filed on May 12, 2020.

(51) Int. Cl.
*H02K 3/50* (2006.01)
*H02K 3/52* (2006.01)
(Continued)

(52) U.S. Cl.
CPC .................. *H02K 3/50* (2013.01); *H02K 3/28* (2013.01); *H02K 3/52* (2013.01); *H02K 5/225* (2013.01);
(Continued)

(58) Field of Classification Search
CPC ........ H02K 3/12; H02K 3/50; H02K 2203/06; H02K 2203/09; H02K 3/522; H02K 3/28;
(Continued)

(56) References Cited

U.S. PATENT DOCUMENTS 8,716,910 B2   5/2014 Edrington
9,768,655 B2   9/2017 Neet
(Continued)

FOREIGN PATENT DOCUMENTS

CN      210490577 U    5/2020
JP   2007-295698 A    11/2007
(Continued)

OTHER PUBLICATIONS

International Search Report corresponding to International Patent Application No. PCT/US2021/032004, dated Aug. 30, 2021 (3 pages).
(Continued)

*Primary Examiner* — Alexander A Singh
(74) *Attorney, Agent, or Firm* — Maginot, Moore & Beck, LLP

(57) ABSTRACT

An electric machine includes a stator assembly having a core with windings positioned on the core. The windings including in-slot portions, end turns, and leads. The leads include a plurality of inner leads extending from conductors in an inner layer of the slots and outer leads extending from conductors in an outer layer of the slots, the inner leads and the outer leads defining a semi-cylindrical space. The stator assembly further includes a bus bar assembly connected to the leads, the bus bar assembly including a plurality of series connections and a plurality of phase leads. Each of the series connections connects one of the inner leads to one of the outer leads within the semi-cylindrical space. Each of the phase leads connects at least one of the inner leads to at least one of the outer leads.

20 Claims, 12 Drawing Sheets

(51) Int. Cl.
  *H02K 3/28* (2006.01)
  *H02K 5/22* (2006.01)
(52) U.S. Cl.
  CPC ..... *H02K 2203/06* (2013.01); *H02K 2203/09* (2013.01)
(58) Field of Classification Search
  CPC ............ H02K 5/225; H02K 5/22; H02K 3/52; H02K 3/38; H02K 3/521
  USPC .......................................................... 310/71
  See application file for complete search history.

(56) References Cited

U.S. PATENT DOCUMENTS

| | | | |
|---|---|---|---|
| 9,941,762 B2 | 4/2018 | Tamura | |
| 9,954,408 B2 | 4/2018 | Nakamura et al. | |
| 10,298,083 B2 | 5/2019 | Okamoto et al. | |
| 2009/0127948 A1* | 5/2009 | Shimizu | H02K 3/50 903/906 |
| 2017/0237310 A1 | 8/2017 | Nakamura et al. | |
| 2017/0310183 A1 | 10/2017 | Jang et al. | |
| 2018/0097416 A1* | 4/2018 | Dang | H02K 3/50 |
| 2021/0359568 A1* | 11/2021 | Goto | H02K 15/0081 |

FOREIGN PATENT DOCUMENTS

| | | |
|---|---|---|
| JP | 2014-007829 A | 1/2014 |
| WO | 2019-088424 A1 | 5/2019 |

OTHER PUBLICATIONS

Written Opinion of the International Searching Authority corresponding to International Patent Application No. PCT/US2021/032004, dated Aug. 30, 2021 (5 pages).

* cited by examiner

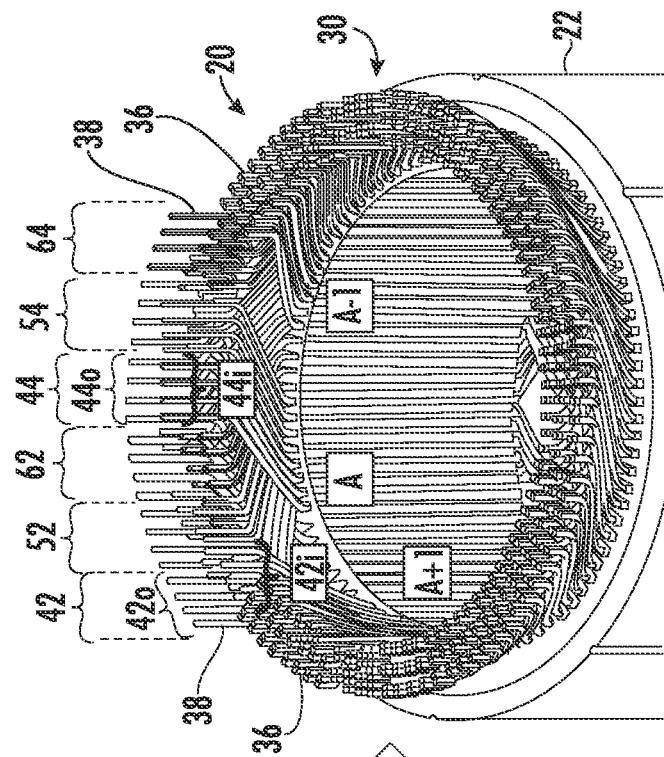
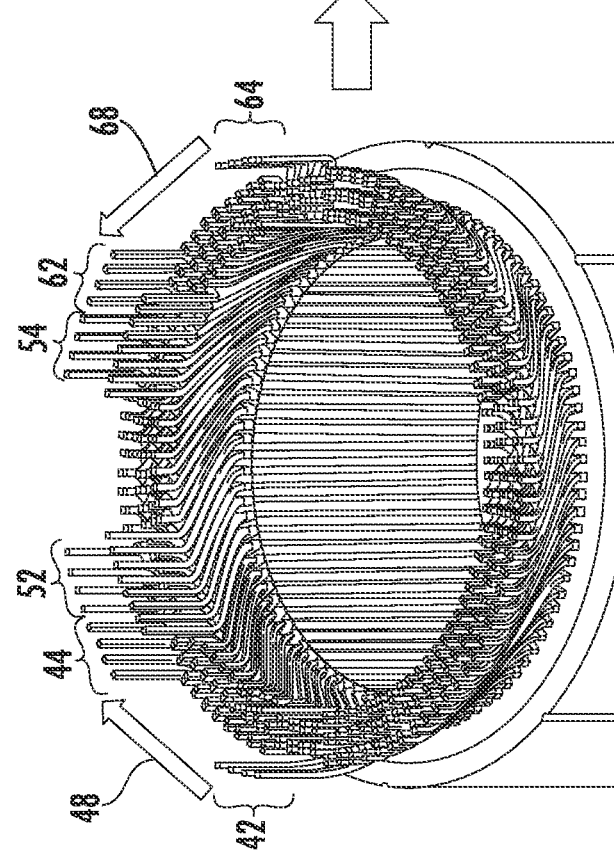
FIG. 2A
FIG. 2B

STATOR WITH INTERNAL CONNECTIONS FOR WINDING LEADS

CROSS-REFERENCE TO RELATED APPLICATIONS

This application claims the benefit of U.S. Provisional Patent Application No. 63/023,800, filed May 12, 2020, the entire contents of which are incorporated herein by reference.

FIELD

The present disclosure relates to the field of electric machines, and more particularly, stator winding arrangements and bus bar connections for such winding arrangements.

BACKGROUND

High slot fill stators are commonly used electric machines, as they provide numerous advantages, including increased efficiency and power density. High slot fill stators typically include many or all of the following features: (i) rectangular shaped slots; (ii) insulated wires with a rectangular shape; (iii) wires having wire slot segments that are housed in the slots in one radial row per slot; (iv) a circumferential width of the wire that closely fits to the width of the insulated slot; (v) end turns in a gabled shape that connect one wire slot segment in one slot to another wire slot segment housed in another slot; (vi) for optimum nesting of the end loops, for each phase, a first group of wires has an electrical degree equal to N degrees and a second group of wires has an electrical degree of N+180 degrees (i.e., for each phase, the emf cycle in the first group of wires is 180° offset from the emf cycle in the second group of wires); and (vii) three or more phases. In addition, some high slot fill stators further include one or more of the following features: (viii) multiple slots per pole per phase; (ix) series connection that connects two of the wires in series; (x) a bus bar comprised of a plastic body and electrical tracks that are welded to the leads of the stator wires, wherein the tracks complete series connections, neutral connections and phase connections; and (xi) over-under end loops—where two adjacent wires of the same phase have different pitches that cause at least one end loop to be located above at least one other end loop.

Often in the above-described stator arrangements, the series connection in the bus bar is completed between one wire in the N degree group with another wire in the N+180 degree group (i.e., each wire in the N degree group must be connected in series to one of the wires in the N+180° group). One drawback with this connection scheme is it requires many connections to cross each other. The series tracks therefore have to be axially layered at the top of the end turns, which causes the bus bar to have a high axial height. This extra height may create packaging problems in many applications, such as many motor vehicle applications with limited space in the engine compartment. One method to reduce the crossing of the series tracks is to spread the leads of the three phases around the stator circumference (i.e., around the outer diameter of the windings). However, this can also create a package problem because, in some applications, only a limited amount of space is available around the outer diameter of the windings. For example, some applications may have limited space around the outer diameter that prohibits the stator from utilizing a large arcing bus bar that extends circumferentially around the outer diameter of the windings (e.g., and arc of 150°-180° or more).

In view of the foregoing, it would be advantageous to provide a stator having a bus bar that does not increase the axial length of the stator. It would also be advantageous to provide a stator having a bus bar with a reduced arc in the circumferential direction. Moreover, it would be advantageous for the bus bar of such stator to be configured for relatively easy and inexpensive production as well as easy connection to the stator windings.

SUMMARY

In at least one embodiment, an electric machine includes a stator assembly having a core with windings positioned on the core. The windings include in-slot portions, end turns, and leads. Each in-slot portion of the windings is positioned in one of the slots of the core, each of the end turns extends between two of the in-slot portions, and each of the leads extends from one of the in-slot portions at one end of the core with the leads extending axially outward past the end turns. The leads include a plurality of inner leads extending from conductors in an inner layer of the slots and outer leads extending from conductors in an outer layer of the slots, the inner leads and the outer leads defining a semi-cylindrical space. The stator assembly further includes a bus bar assembly connected to the leads, the bus bar assembly including a plurality of series connections and a plurality of phase leads. Each of the series connections connects one of the inner leads to one of the outer leads within the semi-cylindrical space. Each of the phase leads connects at least one of the inner leads to at least one of the outer leads.

In at least one embodiment, an electric machine includes a stator assembly and a bus bar assembly. The stator assembly includes a core with windings positioned on the core, the windings including inner leads and outer leads extending from one end of the stator assembly. The bus bar assembly is connected to the inner leads and the outer leads. The bus bar assembly includes a plurality of series connections, each of the series connections including a first end connected to an inner side of one of the outer leads and a second end connected to an outer side of one of the inner leads.

In at least one further embodiment, an electric machine comprises a stator assembly including a core with windings, the windings comprising a plurality of winding paths wound on the core, the windings further comprising inner leads and outer leads extending from one end of the stator assembly with a semi-cylindrical space defined between the inner leads and the outer leads. A bus bar assembly is connected to the windings, the bus bar assembly including a plurality of connections extending within the semi-cylindrical space between the inner leads and the outer leads, each of the connections including a circumferential portion positioned between the inner leads and the outer leads.

The above described features and advantages, as well as others, will become more readily apparent to those of ordinary skill in the art by reference to the following detailed description and accompanying drawings. While it would be desirable to provide an electric machine with a stator winding arrangement and bus bar assembly that provides one or more of these or other advantageous features, the teachings disclosed herein extend to those embodiments which fall within the scope of the appended claims, regardless of whether they include any of the features described herein or accomplish any of the advantages described herein.

BRIEF DESCRIPTION OF THE DRAWINGS

FIG. 2A shows a perspective view of a stator winding arrangement wherein one group of winding leads is shifted clockwise and another group of winding leads is shifted counterclockwise relative to a middle previous winding.

FIG. 2B shows a modified version of the stator winding arrangement of FIG. 2A wherein all of the winding leads are arranged to extend from consecutive slots.

DESCRIPTION

Figure 1:
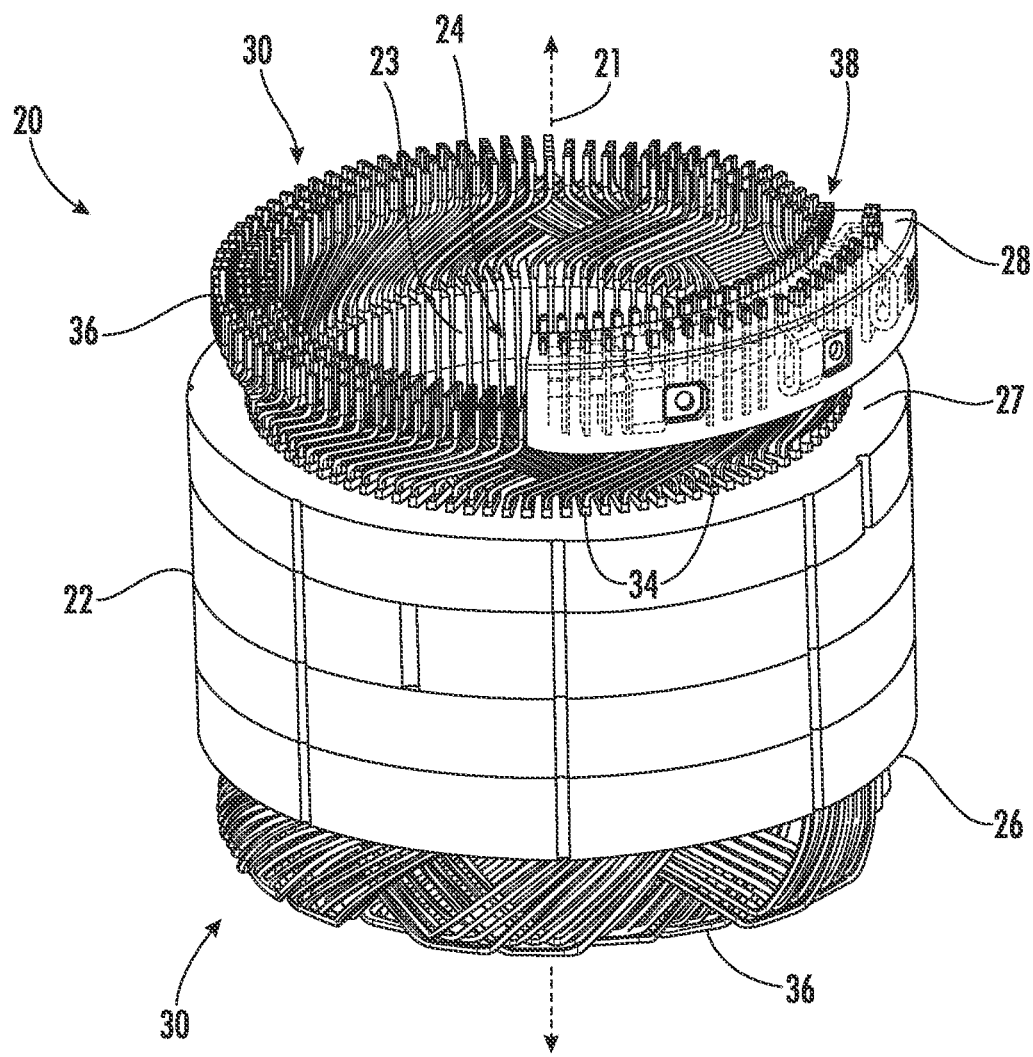
FIG. 1 is a perspective view of a stator with internal connections for winding leads.

With reference to FIGS. 1-15, a stator with internal connections for winding leads is disclosed. The stator 20 includes a stator core 22 with a winding arrangement 30 positioned on the stator core 22. A plurality of winding leads 38 extend from the winding arrangement 30 and a bus bar assembly 28 is connected to the leads 38. The bus bar assembly 28 provides internal connections provided between winding leads 38. As described in further detail herein, the internal connections include series connections, neutral connections, and phase connections.

Stator Core

The stator core 22 is comprised of a ferromagnetic material and is typically formed from a plurality of steel sheets that are stamped and stacked upon one another to form a lamination stack, as will be recognized by those of ordinary skill in the art. As shown in FIG. 1, the stator core 22 is generally cylindrical in shape as defined by a center axis 21 and two ends 26, 27. The stator core 22 further includes an inner perimeter surface defining an inner diameter of the core 22, and an outer perimeter surface defining an outer perimeter of the core 22. A plurality of teeth 23 are formed on the interior portion of the stator core 22 and are directed inwardly toward the center axis 21. Each tooth 23 extends radially inward and terminates at the inner perimeter surface.

Axial slots 24 are formed in the stator core 22 between the teeth 23. The slots 24 may be open along the inner perimeter surface of the stator core 22, or may be semi-closed slots with each slot having a smaller width near the inner perimeter surface than the width closer to the outer perimeter surface. Openings to the slots 24 are provided between the teeth 23 (i.e., through the inner perimeter surface) as well as through both ends 26, 27 of the stator core 22. Each slot 24 is defined between adjacent teeth 23, with two adjacent teeth forming two opposing radial walls for one slot.

Winding Arrangement

The stator core 22 is configured to retain the winding arrangement 30 within the slots 24 of the stator core 22. In at least one embodiment, the winding arrangement 30 (which may also be referred to herein as "windings") is formed from a plurality of elongated wires (e.g., copper wires) that are continuously wound within the slots 24 on the stator core 22 in order to form the windings. In at least one alternative embodiment, the winding arrangement 30 is formed from a plurality of segmented conductors, as is known to those of ordinary skill in the art. The segmented conductors are inserted into the slots 24 from a first end 26 (e.g., an "insertion end") of the stator core 14. The segmented conductors are connected together at an opposite end 27 (e.g., a "weld end") of the stator core 14.

The conductors of the completed winding arrangement 30 form a plurality of phase windings. In at least one embodiment, the winding arrangement includes three phase windings (e.g., phase U windings, phase V windings, and phase W windings) with multiple winding paths for each phase (i.e., both parallel and series-connected paths within each phase). The three phase windings disclosed herein are star/wye ("Y") connected windings. However, in other embodiments, the windings may be delta ("Δ") connected windings. Also, in the embodiment disclosed herein, the number of slots-per-pole-per-phase for the winding is four. However, in other embodiments windings with a different number of slots-per-pole-per phase may be implemented (e.g., two or three).

The conductors that form the completed windings on the stator core include in-slot portions 34, end turns 36, and winding leads 38. The in-slot portions 34 are straight portions of the conductors located within the slots 24 of the stator core 22. Each in-slot portion 34 carries current from one end 26/27 of the stator core 22 to the opposite end 27/26 of the stator core. As will be recognized by those of skill in the art, the in-slot portions 34 may be aligned in a single file line in each slot, and each position in the line may be referred to as a conductor "layer" of the slot. In the embodiments of the windings 30 shown wherein, each slot 24 includes six layers of conductors layers arranged in a single file line from an inner layer to an outer layer. However, it will be recognized that in other embodiments, each slot 24 may include fewer or more than six layers of conductors.

Figure 19:
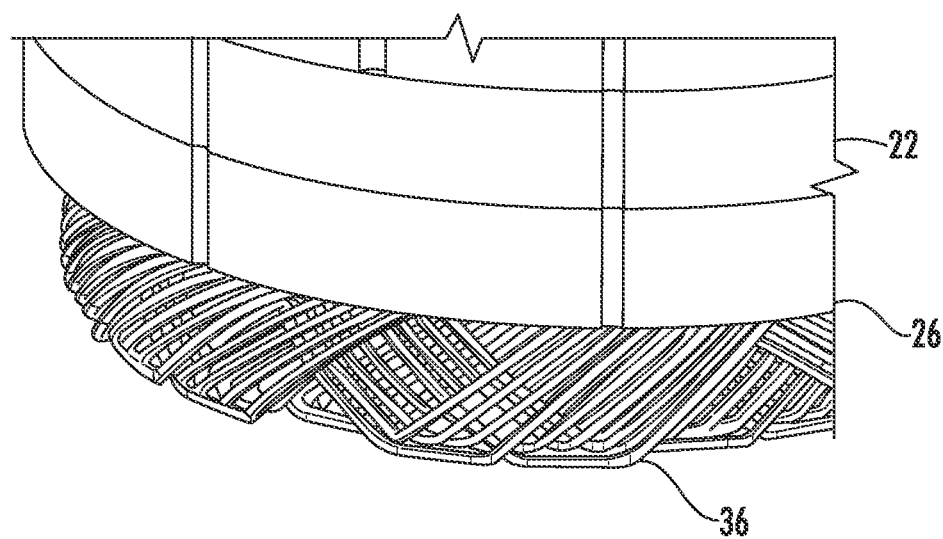
FIG. 19 shows end turns of the winding arrangement on an opposite end of the stator from the track assembly.

With continued reference to FIG. 1, the end turns 36 (which may also be referred to herein as "end loops") are the conductor portions where a change of direction occurs outside of the slots 24 at an end of the stator core 22. As noted previously, the end turns 36 may include bent portions and/or welded portions of the conductors. Each end turn 36 includes a conductor that exits one slot at an end of the stator core 14, is bent/twisted away from the slot (i.e., at a first degree), forms an end loop (e.g., a "U-turn" or other 180° change of direction), is bent/twisted toward a different slot (at a complementary second degree), and then enters that different slot on the same end of the stator core. As such, each end loop 36 extends between two in-slot portions 34 and across a number of slots at an end of the stator core 14. In embodiments wherein the windings are formed from segmented conductors, the end turns 36 on the insertion end 26 of the core are formed from a single bent wire (see FIG. 19), and the end turns 36 on the weld end 27 of the core are formed from two segmented conductors having adjacent aligned leg ends that are welded together. The end turns 36 are collectively represented in FIG. 1 by a conglomeration of conductors that form a disc-like shape at each end of the 26/27 of the stator core 22.

The winding leads 38 are conductor portions that provide an entry/exit to one of the winding paths. Each conductor forming a winding lead 38 is connected to an in-slot portion of the windings. In particular, each winding lead 38 exits a slot 24, is bent/twisted to a similar degree as the end turns, and then extends in an axial direction away from the end turns 36 to a point where the lead 38 terminates, axially outward from the end turns 36. In other words, the leads 38 are shaped similar to half an end turn 36, wherein the lead 38 extends out of a slot and follows the same path as the other end turns, but instead of including a U-turn, the lead continues to extend in an axial direction away from the end loops. Each of the leads 38 terminates at an end 39 of the lead that is axially distant from the end turns 36. As shown in FIG. 1 each end of the lead is joined to a bus bar/conductor provided within the bus bar assembly 28. It will be recognized that the connection between the leads 38 and the conductors in the bus bar assembly 28 may take any of various forms, such as soldering or welding (e.g., a tungsten inert gas (TIG) weld).

With reference now to FIG. 2B, the winding arrangement 30 and leads 38 are shown in isolation from the bus bar 28. A total of forty-eight leads are provided by the winding arrangement 30, with twenty-four inner leads (i.e., leads extending from the innermost slots) and twenty-four outer leads (i.e., leads extending from the outermost slots). Each lead 38 represents the start or finish of a portion of a path in the windings 30. To this end, each lead 38 provides either a phase lead, a series lead connecting two series paths, or a neutral lead. As will be recognized in FIG. 2B, all leads extend from consecutive slots of the stator. In particular, while the stator shows a total of ninety-six slots, the windings 30 are configured such that all of the leads 38 extend from a consecutive twenty-four of these slots (e.g., the leads all extend from slots 1-24, and no leads extend from slots 25-96).

For the sake of identification, the leads shown in FIG. 2B have been categorized into six groups (i.e., groups 42, 44, 52, 54, 62 and 64), with two groups associated with each of the three phases (U, V, W). Groups 42 and 44 are associated with a first phase (e.g., phase U), and are electrically 180° apart (i.e., if group 42 is considered to be Group $N_U$, group 44 is Group $N_U+180$). Similarly, groups 52 and 54 are associated with a second phase (e.g., phase V), and are electrically 180° apart (i.e., if group 52 is considered to be Group $N_V$, group 54 is Group $N_V+180$). Groups 62 and 64 are associated with a third phase (e.g., phase W), and are electrically 180° apart (i.e., if group 62 is considered to be Group $N_W$, group 64 is Group $N_W+180$).

Each of the groups 42, 44, 52, 54, 62 and 64 is further divisible into a sub-group of outer leads (which may also be considered "start leads") and inner leads (which may also be considered "finish leads" or "end leads"). For example, in group 42, reference numeral 42o is positioned in proximity to the outer leads of group 42, and reference numeral 42i is positioned in proximity to the inner leads of group 42. Each lead in a sub-group may also be identified herein, with a numeral. For example, the leftmost lead in subgroup 42o may be identified as lead $42o_1$, and the rightmost lead in subgroup 42i may be identified as lead $42i_4$. Each of the inner leads 42i is radially aligned with one of the inner leads 42o.

The number of slots-per-pole-per phase in the winding arrangement 30 is greater than one. In the exemplary winding arrangement 30 disclosed herein, the number of slots-per-pole-per phase is four, and therefore there are four leads in each sub-group (i.e., four start/outer leads and four finish/inner leads, for a total of eight leads in each group). As will be explained in further detail below, within each sub-group of four leads, two of these leads are connected to in series to two respective leads in a radially opposed sub-group. Also, two of the leads in each group are connected to a neutral connection, and two of the leads in each group are connected to one of the three phase terminals (i.e., U, V or W).

It will be recognized that the winding arrangement 30 shown in FIG. 2B is distinct from other winding arrangements wherein the leads do not extend from consecutive slots. For example, FIG. 2A shows an embodiment of a winding arrangement wherein the leads from each phase are all adjacent to one another and span 180° (physically) around the core of the electric machine. While this winding arrangement could be implemented with a larger bus bar than that shown in FIG. 1, the arrangement of FIG. 2B is advantageous because the bus bar 28 only spans about 90° around the stator core. In order to change the winding arrangement of FIG. 2A to the winding arrangement of FIG. 2B (where the leads all extend from consecutive slots), the leads 38 in groups 42 and 44 are both shifted one pole to the right (as noted by arrow 48). Similarly, the leads in groups 62 and 64 are all shifted one pole to the left (as noted by arrow 68). The winding arrangement 30 of FIG. 2B is advantageous in comparison to that of FIG. 2A because all of the leads 38 of all winding phases (i.e., U, V and W) are grouped close together on the stator. As can be seen in FIG. 2B, the start leads of the group 42 (i.e., Group $N_U$) extend from one pole (noted as pole "A" on the inner perimeter surface in FIG. 2B), and the finish leads of group 42 extend from an adjacent left pole for the same phase (noted as pole "A+1" in FIG. 2B). Similarly, the start leads of group 44 (i.e., Group $N_U+180$ degrees) extend from an adjacent right pole for the same phase (noted as pole "A−1" in FIG. 2B), and the finish leads of group 44 extend from the aforementioned one pole (i.e., pole "A" in FIG. 2). In view of this, it will be recognized that similar lead and pole configurations also exist for the other phases (i.e., the start leads of groups 52 and 62 extend from respective poles, and the finish leads of groups 52 and 62 extend from adjacent left poles for the same phase, while the start leads of groups 54 and 64 extend from adjacent right poles for the same phase, and the finish leads of groups 54 and 64 extend from the aforementioned respective poles).

With continued reference to FIG. 2B, it will be recognized that a semi-cylindrical space is defined by the leads 38. This semi-cylindrical space can be visualized in FIG. 2B by the space occupied by all of the leads 38 (including lead groups 42, 44, 52, 54, 62 and 64), as well as the space between the leads 38. The semi-cylindrical space has an axial height that extends from the tops of the end turns 36 (i.e., the plane defined by the apexes of the end turns 36) to the tops of the leads 38 (i.e., the plane that retains the terminal ends of the leads 38). Accordingly, this semi-cylindrical space is defined by the leads 38 and is defined by axial, radial, and circumferential components.

Figure 3:
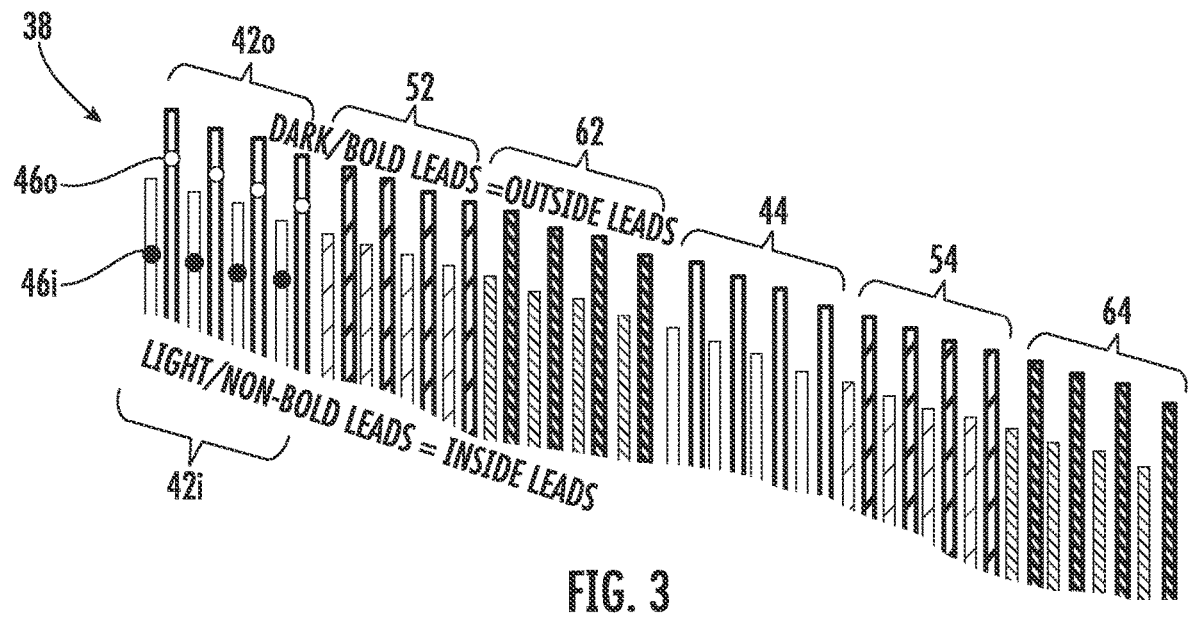
FIG. 3 illustrates the lead groups of FIG. 2B in a linear arrangement wherein the longer leads with darker shading represent the outer leads, and the shorter leads with lighter shading represent the inner leads.

FIG. 3 shows a diagram of the leads 38 of the stator of FIG. 2B in linear form for the sake of convenience in the illustration. In FIG. 3, the longer leads with darker shading represent the outer leads, and the shorter leads with lighter shading represent the inner leads. As noted previously, the leads 38 are shown after twisting, and all of the leads 38 in the lead groups 42, 44, 52, 54, 62 and 64 extend from consecutive slots of the stator core (i.e., the leftmost inner lead extends from one slot of the core and each consecutive lead to the rightmost inner leads extends from a consecutive slot of the core; similarly, the leftmost outer lead extends from another slot of the core and each consecutive lead to the rightmost outer lead extends from a consecutive slot of the core). As also noted previously, the inner and outer conductors in each group lead group 42, 44, 52, 54, 62 and 64 are associated with poles that are electrically 180° offset. For example, leads 42$o$ (identified by the lighter dots 46$o$) are associated with a first pole, and leads 42$i$ (identified by the darker dots 46$i$) are associated with a second pole that is one pole away from the first pole. However, after twisting, the leads 42$o$ are radially aligned with leads 42$i$.

Series Connections

Figure 4:
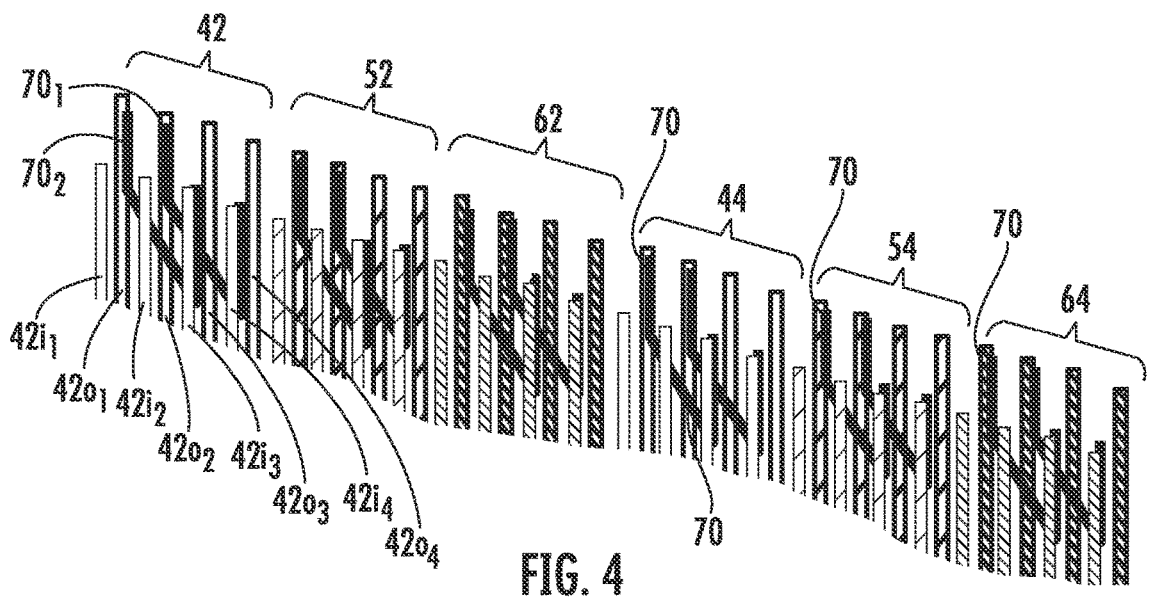
FIG. 4 shows series connections/tracks extending between leads in each of the lead groups of FIG. 3.

FIG. 4 shows series connections 70 that are provided within the busbar assembly 28 and extend between leads of FIG. 3. Each series connections 70 (which may also be referred to herein as a "series track") is a relatively short conductor segment that extends between the outer leads (i.e., the start leads) and the inner leads (i.e., the finish leads) within a single group of leads. The conductors used to form the series connections 70 may be similarly shaped to the winding conductors, such as a conductors having a rectangular cross-section. As the name suggests, each series connection 70 provides for a series connection between paths of a particular phase. In the embodiment of FIG. 4, the series connections in each group connect the first (i.e., leftmost) outer lead to the third inner lead, and the second outer lead to the fourth (i.e., rightmost) inner lead. For example, in lead group 42, series connection $70_1$ in FIG. 4 connects outer lead $42o_1$ to inner lead $42i_3$. Similarly series connection 702 connects outer lead $42o_2$ to inner lead $42i_4$. Similar connections also exist between the inner lead and outer lead for all of the other lead groups 44, 52, 54, 62 and 64.

Figure 5:
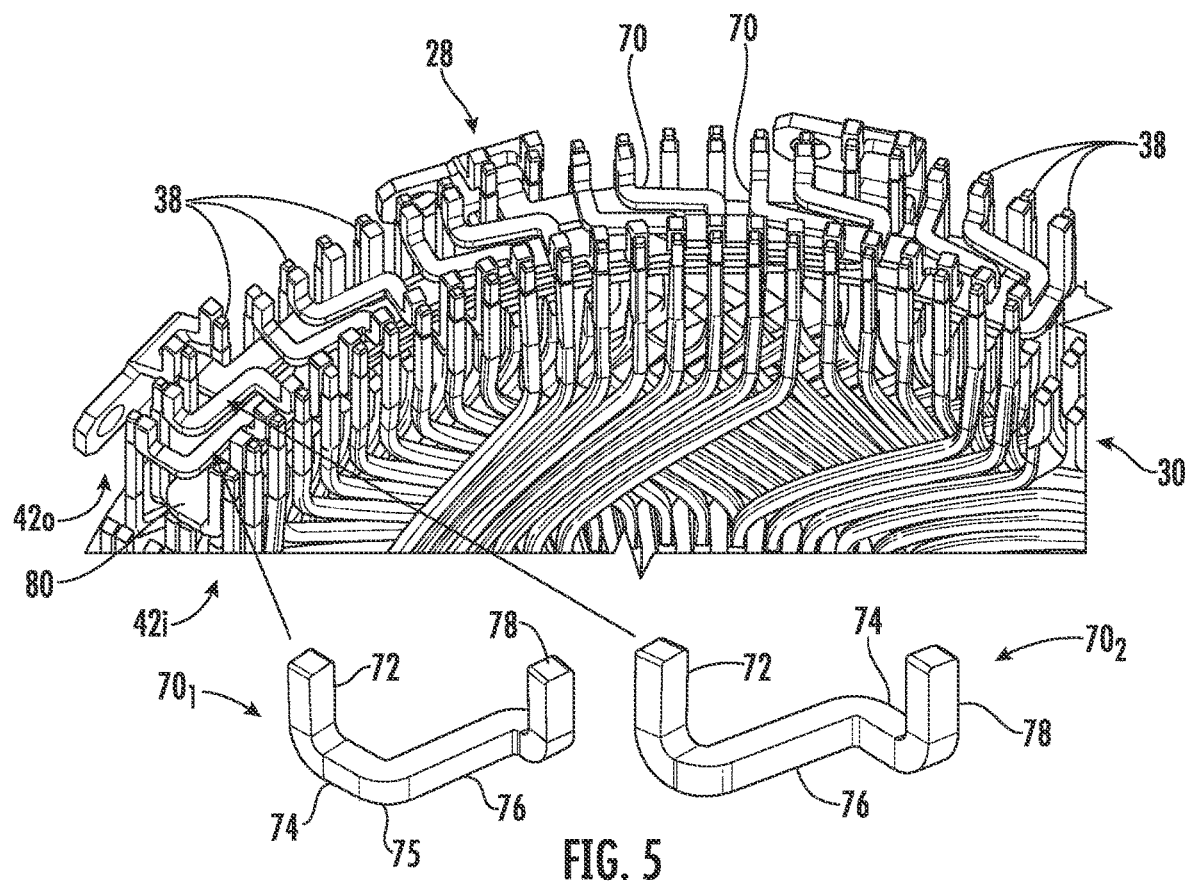
FIG. 5 shows a perspective view of the winding arrangement and series connections of FIG. 4 extending between the leads in each lead group, wherein the series connections are provided as part of a bus bar assembly.
Figure 6:
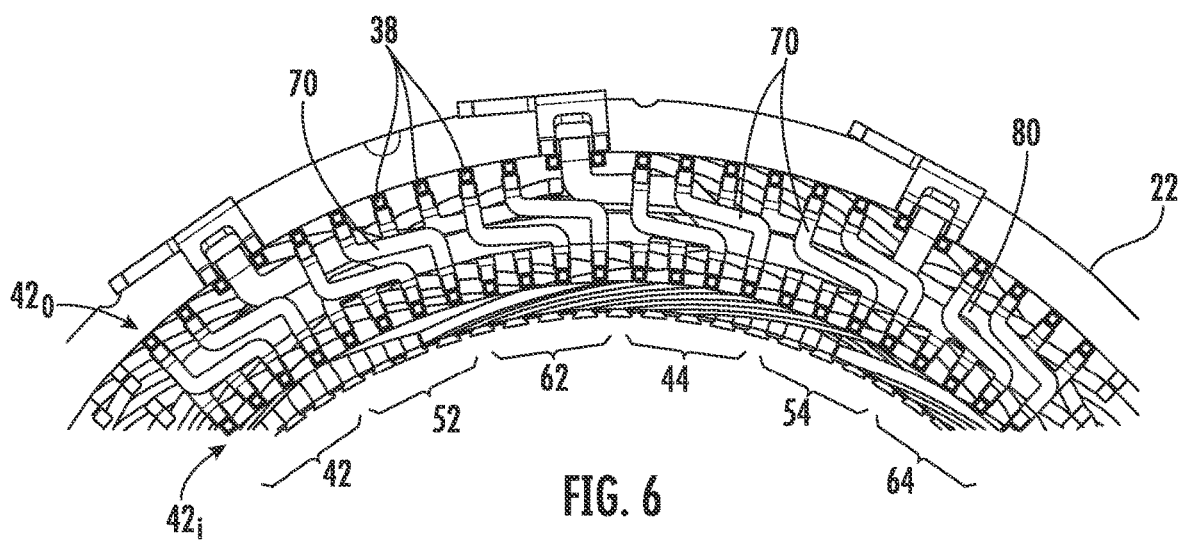
FIG. 6 shows a top (i.e., axial) view of the winding arrangement and the series connections of FIG. 5.

FIGS. 5 and 6 shows an exemplary embodiment of the series connections 70 of FIG. 4 extending between the leads 38 in the stator winding arrangement 30. As shown in the figures, each series connection 70 is positioned within the semi-cylindrical space defined by the leads 38, and connects one of the outer leads to one of the inner leads within a lead group. In the embodiment of FIG. 4, each series connection 70 includes an outer axial leg 72, a radial portion 74, a circumferential portion 76, and an inner axial leg 78. A curve or bend 75 may provide a transition between each portion of the series track 70. The outer axial leg 72 is aligned with and abuts the radially inward side of one of the outer leads (e.g., one of 42$o$) in order to facilitate connection between the outer axial leg 72 and the outer lead, such as by heat staking or welding. The radial portion 74 extends the series track 70 radially toward the radially opposite leads within the group (e.g., from leads 42$o$ toward leads 42$i$). The circumferential portion 76 extends the series track 70 circumferentially to the lead within the group where a series connection is to be made (e.g., from lead $42o_1$ to lead $42i_3$). The inner axial leg 78 is aligned with and abuts the radially outward side of one of the inner leads (e.g., one of 42$i$) in order to facilitate connection between the inner axial leg 78 and the inner lead. A weld or other connection means is provided to securely connect the inner axial leg 78 to the associated inner lead.

Neutral Connections

Figure 7:
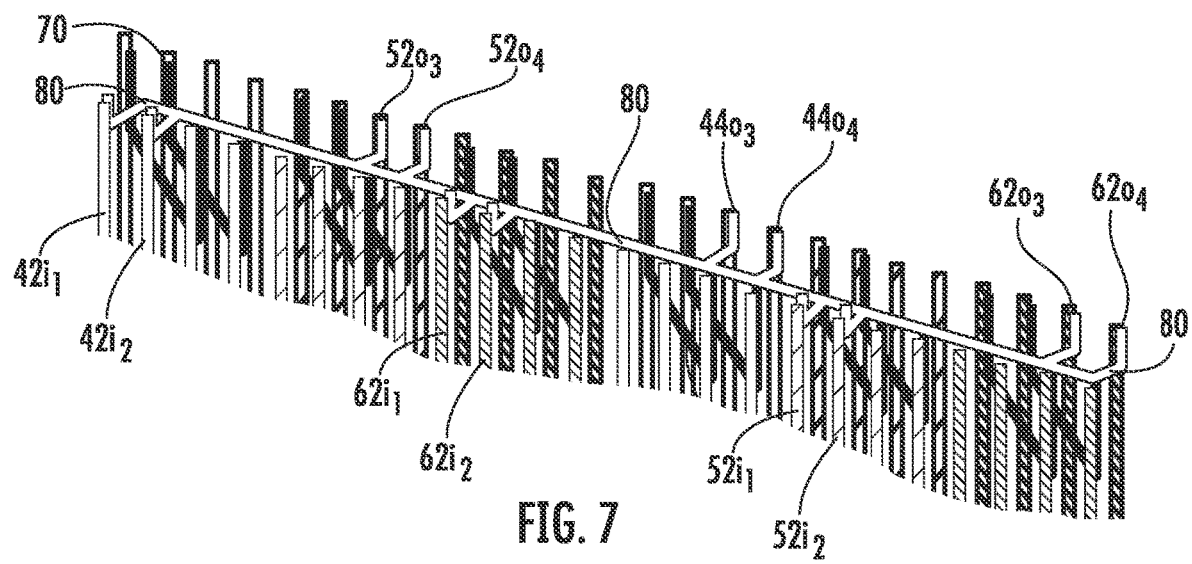
FIG. 7 illustrates the lead groups of FIG. 4 with a neutral connection/track extending between the leads in addition to the series connections.

FIG. 7 is similar to FIG. 4, but FIG. 7 further shows the neutral connection 80 that is provided within the busbar assembly 28. The neutral connection 80 (which may also be referred to herein as a "neutral track") is a relatively long conductor segment that extends between and connects multiple leads 38 of the winding arrangement 30. As the name suggests, the neutral track 80 provides for the neutral connection for the wye winding arrangement disclosed herein. Accordingly, the neutral track 80 provides an electrical connection between multiple inner lead and multiple the outer leads. In the embodiment of FIG. 7, the neutral track 80 is connected to either two inner leads or two outer in each lead group including connections to each of the following leads: $42i_1$, $42i_2$, $52o_3$, $52o_4$, $62i_1$, $62i_2$, $44o_3$, $44o_4$, $54i_1$, $54i_2$, $64o_3$, and $64o_4$.

Figure 8:
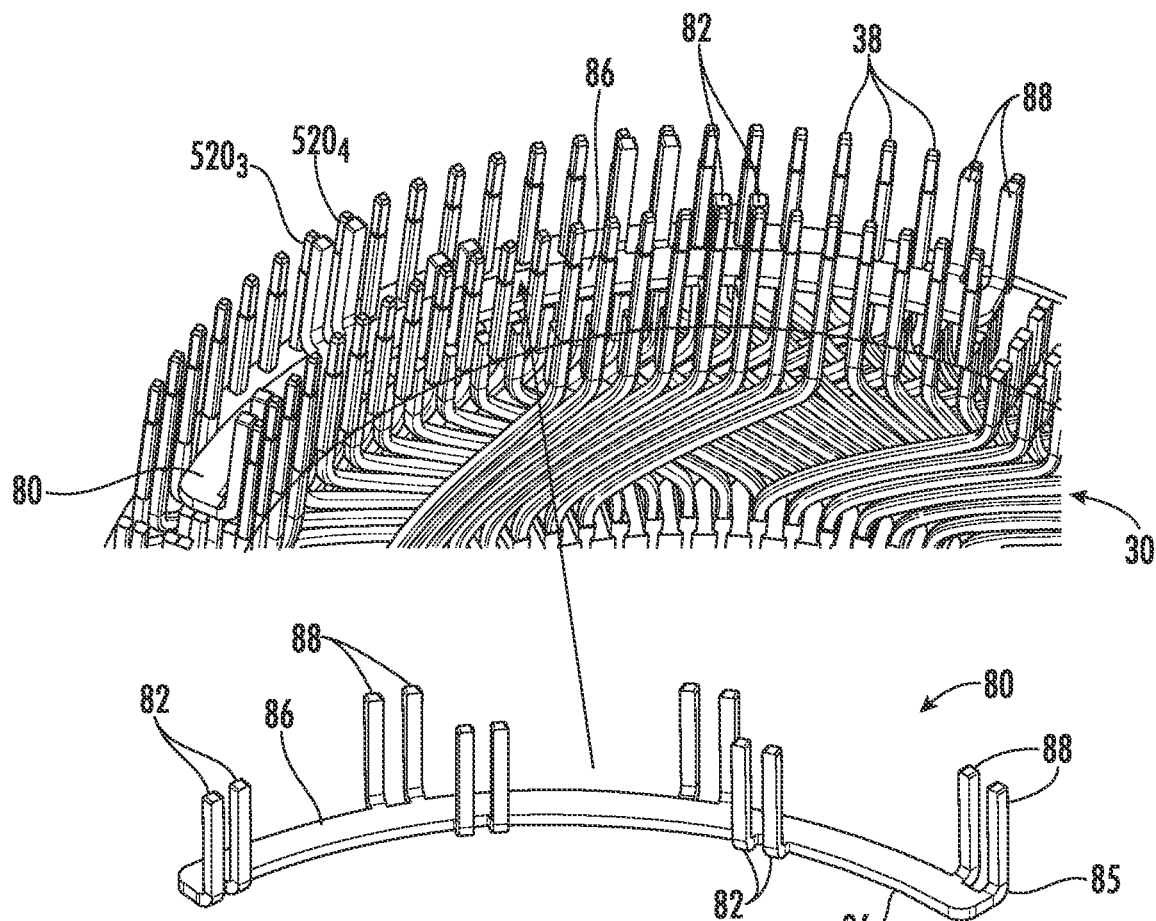
FIG. 8 shows a perspective view of the neutral track of FIG. 7 extending between the phase leads in the stator winding arrangement, the neutral track forming part of the bus bar assembly.
Figure 9:
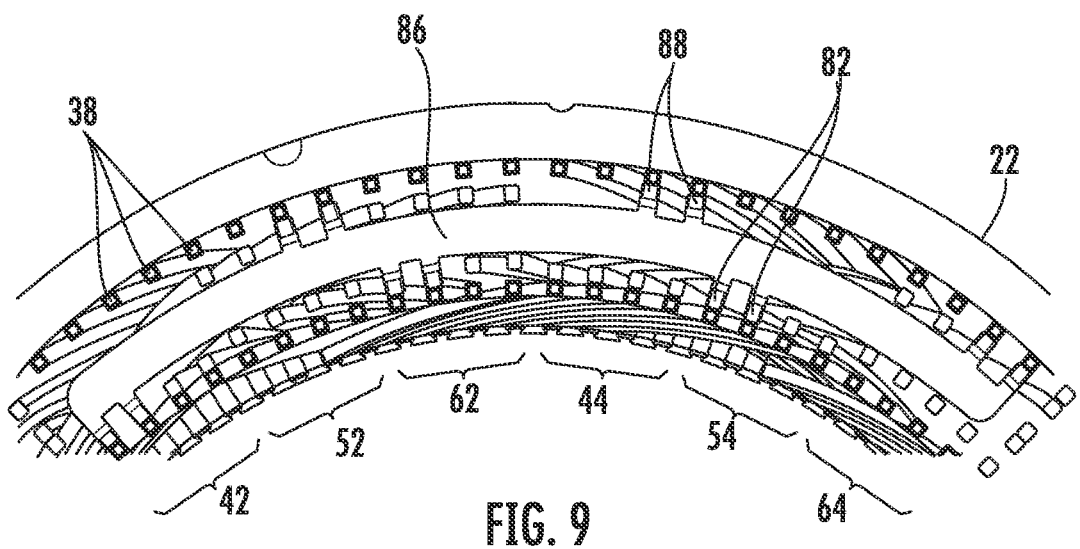
FIG. 9 shows a top view of the winding arrangement and neutral track of FIG. 8.

FIGS. 8 and 9 show an exemplary embodiment of the neutral connection 80 of FIG. 7 extending between the leads 38 in the stator winding arrangement 30. As shown in the figures, the neutral track 80 is positioned within the semi-cylindrical space defined by the leads 38, and connects to either two outer leads or two inner leads within each lead group, and particularly to six outer leads and six inner leads. In the embodiment of FIG. 7, the neutral track 80 includes six outer axial legs 88, a circumferential portion 86, and six inner legs 82. A curve or bend 85 may provide a transition between the circumferential portion 86 and the legs 82, 88. Each outer axial leg 88 is aligned with and abuts the radially inward side of one of the outer leads (i.e., one of $52_{o3}$, $52_{o4}$, $44_{o3}$, $44_{o4}$, $64_{o3}$, and $64_{o4}$). Each inner axial leg 88 is aligned with and abuts the radially outward side of one of the inner leads (i.e., one of $52_{i1}$, $52_{i2}$, $44_{i1}$, $44_{i2}$, $64_{i1}$, and $64_{i2}$). These axial legs 82, 88 are then welded or otherwise connected to associated leads. The circumferential portion 86 is a plate-like member having a rectangular cross-section. The circumferential portion 86 extends the neutral track 80 circumferentially from one end to another of the semi-circumferential space. In the embodiment disclosed herein, the neutral track 80 is positioned axially inward from the series tracks 70 (e.g., in FIG. 6, the neutral track 80 is visible below the series track 70). However, in other embodiments, the neutral track 80 may be positioned axially outward from the series tracks 70.

Phase Connections

Figure 10:
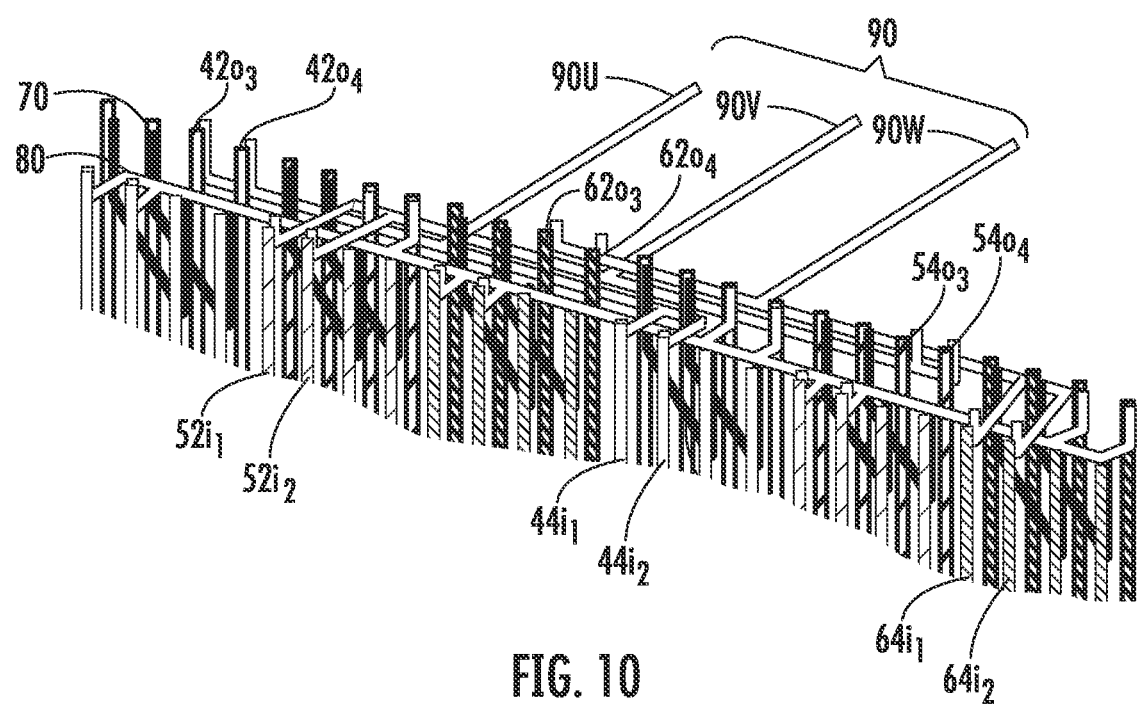
FIG. 10 illustrates the lead groups of FIG. 7 with phase leads/tracks connected to the leads in addition to the neutral connection and the series connection.

FIG. 10 is similar to FIG. 7 but further adds the phase connections 90 for the busbar assembly 28 to the illustration. Each of phase connections 90 (which may also be referred to herein as a "phase tracks") provides a conductive member that extends from radially outside the leads (and thus outside of the semi-cylindrical space) to a position that is inside the semi-cylindrical space. As the name suggests, each phase connection 90 connects all of the phase leads for lead groups of the same phase. In particular, one phase connection 90U connects the two phase leads in group 42 with the two phase leads in group 44 (i.e., $42o_3$, $42o_4$, $44i_1$, and $44i_2$ are all connected by phase connection 90U). Another phase connection 90V connects the two phase leads in group 52 with the two phase leads in group 54 (i.e., $52i_1$, $52i_2$, $54o_3$, and $54o_4$ are all connected by phase connection 90U). Yet another phase connection 90W connects the two phase leads in group 62 with the two phase leads in group 64 (i.e., $62o_3$, $62o_4$, $64i_1$, and $64i_2$ are all connected by phase connection 90W).

Figure 11:
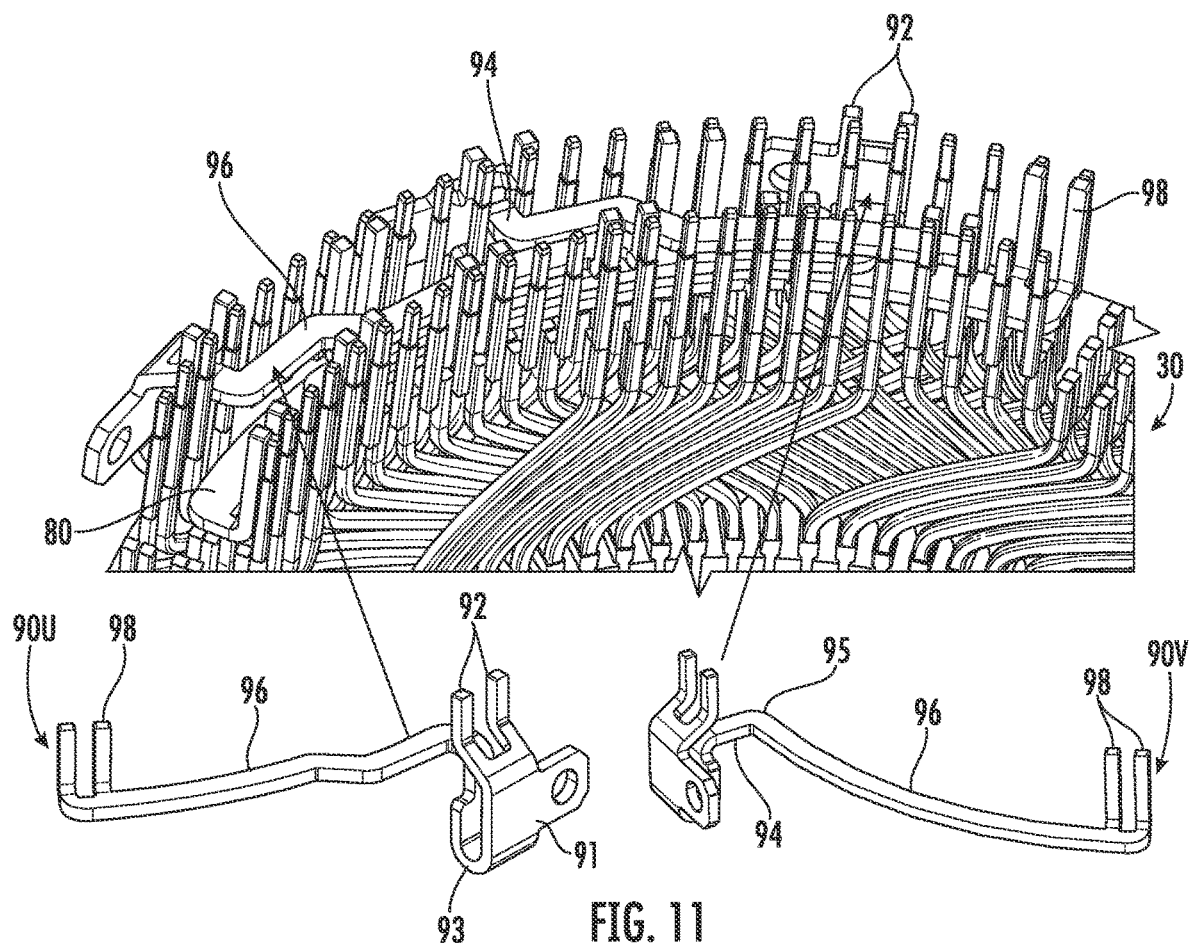
FIG. 11 shows a perspective view of the phase tracks of FIG. 10 extending between and connected to the phase leads in the stator winding arrangement, the phase tracks forming part of the bus bar assembly.
Figure 12:
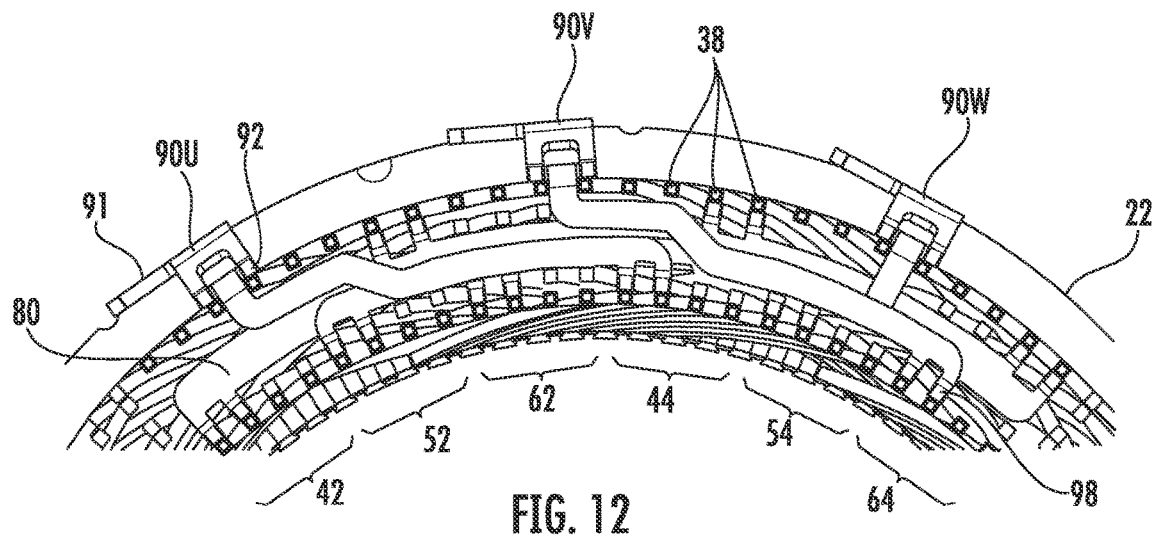
FIG. 12 shows a top view of the winding arrangement and phase tracks of FIG. 11.

FIGS. 11 and 12 shows an exemplary embodiment of the phase connections 90 of FIG. 10 extending between the leads 38 in the stator winding arrangement 30. As shown in the figures, each phase connection 90 includes a portion that is positioned outside of the semi-cylindrical space defined by the leads 38, and another portion that is positioned within the semi-cylindrical space defined by the leads 38. Each phase connection 90 in the disclosed embodiment includes a terminal connection plate 91, two outer axial legs 92, a U-bend portion 93, a radial portion 94, a circumferential portion 96, and two inner axial legs 98. A curve or bend 95 may provide a transition between each portion of the phase connection 90. The terminal connection plate 91 is a generally flat member positioned outside of the semi-cylindrical space, and may include a hole configured to receive a terminal bolt. Each of the two outer axial legs 92 extend from one side of the terminal connection plate 91 are aligned with and abut the radially outward side of one of the outer leads 38 (e.g., for phase connection 90U, the two outer axial legs 92 are aligned with leads $42o_3$ and $42o_4$). A weld or other connection is used to connect the outer axial legs 92 to the associated leads 38. The U-bend portion extends from an opposite side of the terminal connection plate 91 and slightly distances the terminal connection plate 91 from the leads 38 in a radial direction. The radial portion 94 extends radially inward from the U-bend portion 94 and into the semi-cylindrical space defined by the leads 38. The radial portion 94 is sufficiently narrow in width to extend between two adjacent leads 38 without contacting the leads. The circumferential portion 96 extends the phase track 90 circumferentially to two inner leads of the same phase. Each of the inner axial legs 98 is aligned with and abuts the radially outward side of one of the inner leads (e.g., for phase connection 90U, the two inner axial legs 98 are aligned with leads $44i_1$ and $44i_2$). Again, a weld or other connection means is provided to securely connect the inner axial leg 98 to the associated inner lead. As shown in FIGS. 11 and 12, the phase tracks 90 may be positioned axially outward from the neutral track 80 (and radially inward from the series tracks 70). However, as described in further detail below, it will be recognized that the series tracks 70, neutral track 80, and phase tracks 90 may be differently configured in other embodiments.

Bus Bar Assembly

Figure 13:
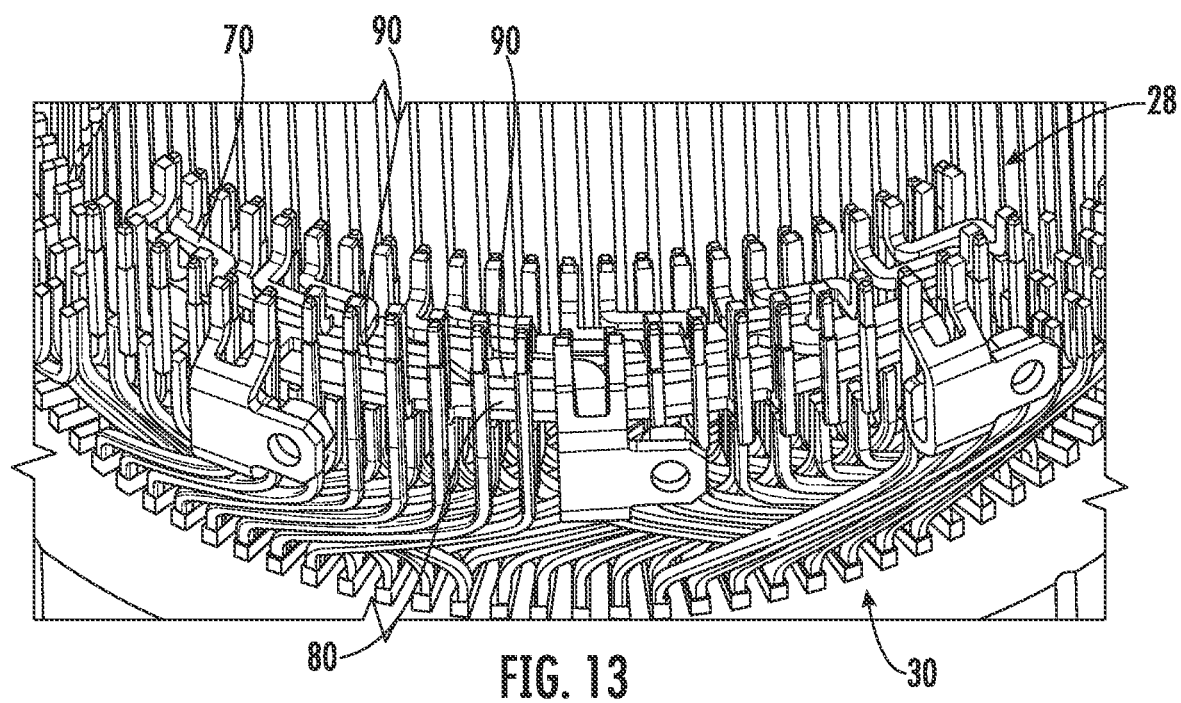
FIG. 13 shows a perspective view of the bus bar assembly, of FIG. 10 positioned on the winding arrangement with a housing of the bus bar assembly removed to expose the neutral track, the series tracks, and the phase tracks.

The above-described series connections 70, neutral connection 80, and phase connections 90 provide the electrical tracks within the complete bus bar assembly 28. FIG. 13 shows the bus bar assembly 28 arranged on the winding 30 with the housing removed to show all of the tracks 70, 80, 90 of the bus bar assembly. As can be seen in FIG. 13 (especially when considered in association with FIGS. 5, 6, 8, 9, 11 and 12), the tracks 80 are arranged into four layers in the bus-bar assembly 28. The neutral track 80 is the most axial-inward track and is arranged the first layer. The phase connections 90 are arranged in two layers axially-outward from the neutral track 80. Track 90W is axially outward from the neutral track 80 and is arranged in the second layer; tracks 90 U and 90V are axially outward from track 90W, and are arranged in the third layer. The series tracks 70 are axially-outward from tracks 90U and 90V and are arranged in the fourth layer. While the embodiments disclosed herein are configured with this particular layering arrangement, it will be recognized that additional layering arrangements are also possible. In any event, because these layers are all arranged within the semi-cylindrical space defined by the leads 38, the bus bar assembly 28 facilitates a stator assembly with a reduced axial height.

Figure 14:
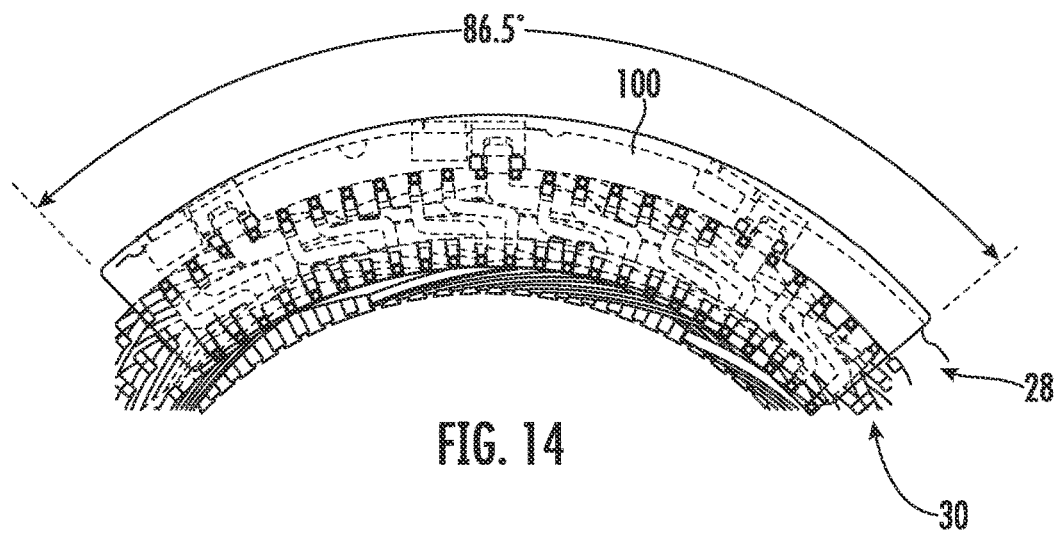
FIG. 14 shows a top view of the winding arrangement and bus bar assembly of FIG. 12 with the housing included.
Figure 15:
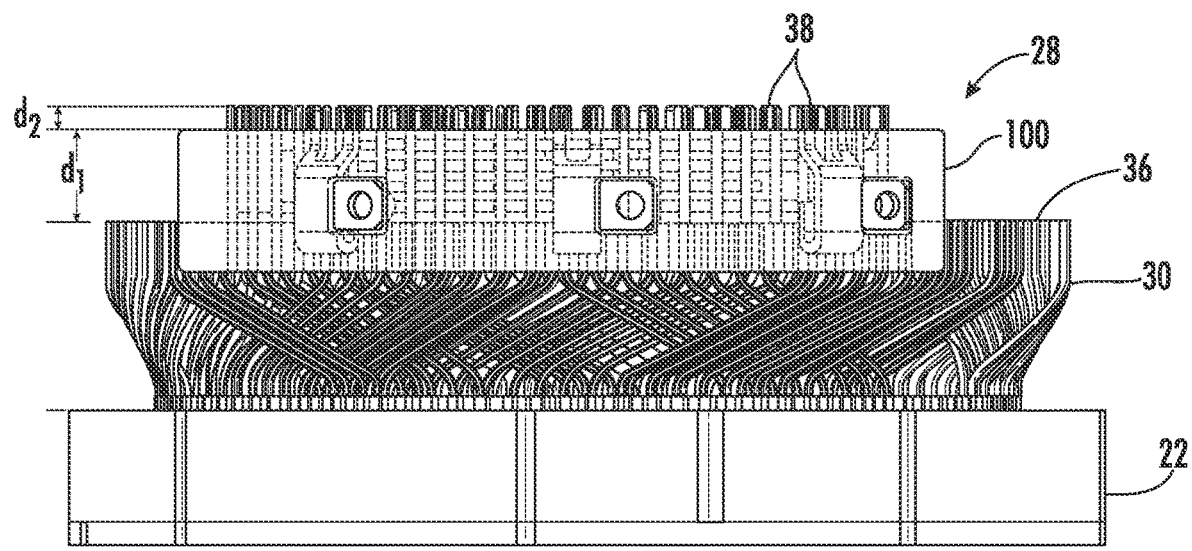
FIG. 15 shows a side (i.e., radial) view of the bus bar assembly of FIG. 12.

FIGS. 14 and 15 show the bus bar assembly 28 with the housing 100 included, the bus bar assembly 28 positioned on the winding arrangement 30 of the stator 20. The housing 100 simply provides a structure that retains all of the tracks 70, 80, 90 in their proper position. As shown in FIG. 14, the housing 100 advantageously spans an angle of about 90° (i.e., between 80° and 100°, and particularly 86.5°).

In at least one embodiment, the housing is an epoxy or other plastic material that is molded around tracks 70, 80, 90. Thus, the tracks 70, 80, 90 all extend through channels in the housing. Additional channels are also formed in the housing to receive the leads 38. These channels allow each of the leads 38 to be properly positioned in alignment with an associated leg of a track 70, 80, 90. As best shown in FIG. 15 the leg ends of the tracks 70, 80, and 90 extend axially outward from the housing 100. This allows for each lead 38 to be welded or otherwise connected to an associated leg of a track 70, 80, 90. Also, each terminal connection 91 of a phase track is positioned radially outward from the housing. This facilitates connection of a bolt or other connection to each of the terminal connections 91.

Because of the above-described arrangement of the various tracks 70, 80, and 90, the entire bus bar assembly 28 only adds an axial height of $d_1+d_2$ to the stator, wherein $d_1$ is the axial distance from the winding end turns to the distal end of the bus bar housing 100, and $d_2$ is the axial distance of the leads extending from the bus bar housing 100.

ALTERNATIVE EMBODIMENTS

Figure 16:
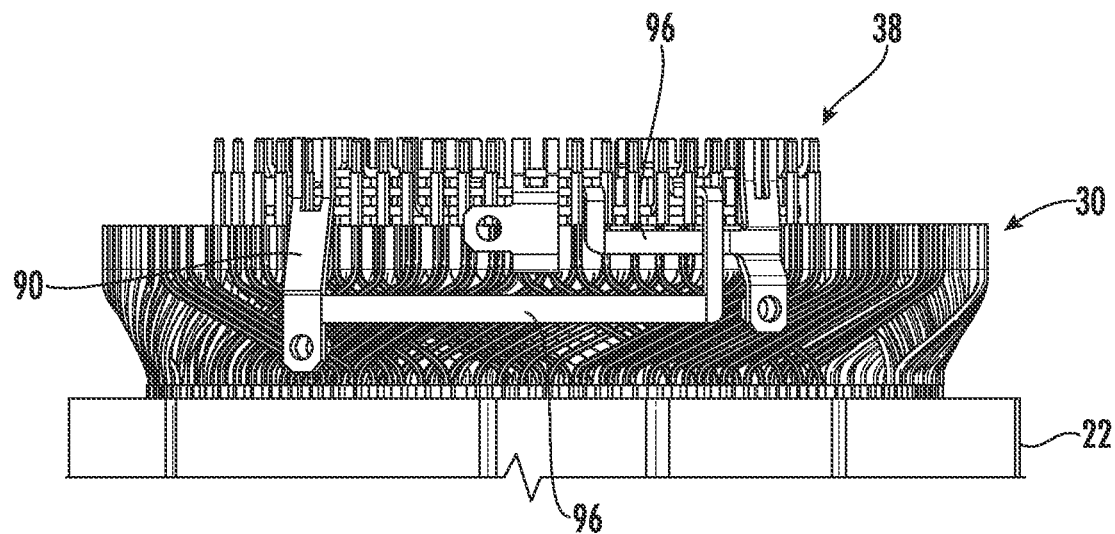
FIG. 16 shows a side view of an alternative embodiment of the tracks in the bus-bar assembly of FIG. 13, wherein the phase tracks are arranged radially outward from the phase tracks.
Figure 17:
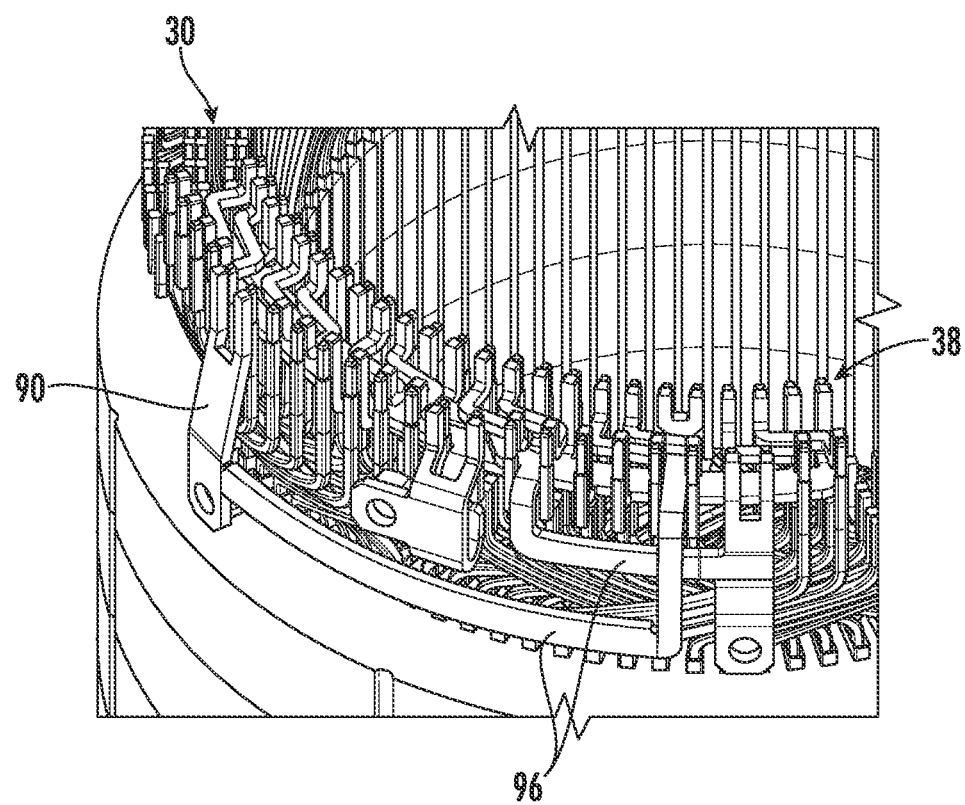
FIG. 17 shows a perspective view of the alternative embodiment of the track assembly of FIG. 16.
Figure 18:
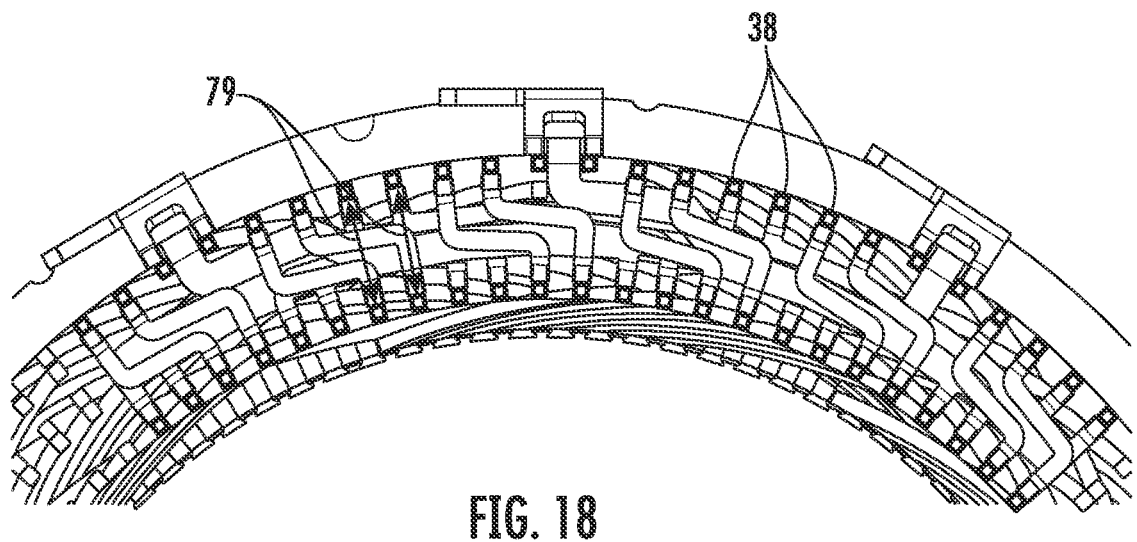
FIG. 18 shows a top view of another alternative embodiment of the series connections of FIG. 6, wherein the series connections are radial as designated by the black arrows.

In the above-described embodiment of FIGS. 3-15, the main body of the phase tracks 90 are layered axially with the neutral and series tracks (e.g., neutral track 80, followed by phase tracks 90 over the neutral track 80, and then series tracks 70 over the phase tracks 90). However, in embodiments where it is desired to further reduce the axial height of the bus bar assembly 28, the layering may be differently arranged in order to reduce the axial height of the bus-bar assembly. In particular, in at least one alternative embodiment as shown in FIGS. 16 and 17, the circumferential portions 96 of the phase leads 90 may be located radially outward of the leads. As a result, the phase leads 90 only require a single layer within the bus bar assembly (as opposed to two, as described above in association with FIGS. 3-15). In this embodiment, the following features may be incorporated, as shown in FIGS. 17 and 18: (i) two phase connection tracks include a main body that extends circumferentially outwards of the outer leads; and (ii) the main body of one phase connection overlaps or crosses the main body of the other phase connection track on the outside of the outer phase leads.

In addition to the above, it will be recognized that even further alternative embodiments are contemplated. In at least one alternative embodiment, the main bodies or at least a portion of one or more of tracks 70, 80, and 90 may be located radially inwards of the inner leads (i.e., inwards of the semi-cylindrical space defined between the leads).

In yet another alternative embodiment, the winding arrangement 30 is configured such that the series tracks 70 are connected to leads that are directly opposed from one another in the radial direction. In the above-described embodiments of FIGS. 1-17, the series connection tracks include a both a radial portion 74 and a circumferential portion (e.g., see the embodiment shown in FIG. 5). The reason for these two portions that the series tracks are not connected to an outer lead and an inner lead that are directly radially opposed form each other. Therefore, in yet another alternative embodiment, the winding is configured such that the series tracks connect an inner lead and an outer lead that radially oppose each other, as shown by the arrows 79 in FIG. 18 (i.e., the series tracks 70 would only include a radial portion 74, and not a circumferential portion in this embodiment).

In addition to the above, numerous additional embodiments are contemplated. For example, in a third alternative embodiment (not shown), the same series connection leads of the embodiment of FIGS. 3-16 are used to make connections, but in addition, the connection leads are twisted more so the series connection tracks no longer require a circumferential component. The series connection tracks can be formed substantially radially.

Although the various embodiments have been provided herein, it will be appreciated by those of skill in the art that other implementations and adaptations are possible. Furthermore, aspects of the various embodiments described herein may be combined or substituted with aspects from other features to arrive at different embodiments from those described herein. Thus, it will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by any eventually appended claims.

What is claimed is:

1. An electric machine comprising:
   a stator assembly including a core with windings positioned on the core, the windings including in-slot portions, end turns, and leads, wherein each in-slot portion is positioned in one of the slots of the core, each of the end turns extends between two of the in-slot portions, and each of the leads extends from one of the in-slot portions at one end of the core with the leads extending axially outward past the end turns, the leads including a plurality of inner leads extending from conductors in an inner layer of the slots and outer leads extending from conductors in an outer layer of the slots, the inner leads and the outer leads defining a semi-cylindrical space; and
   a bus bar assembly connected to the leads, the bus bar assembly including a plurality of series connections, and a plurality of phase leads, wherein each of the series connections connects one of the inner leads to one of the outer leads within the semi-cylindrical space, and wherein each of the phase leads connects at least one of the inner leads to at least one of the outer leads;
   wherein the windings define multiple winding phases, each winding phase including multiple parallel paths, each parallel path including a first portion that winds around the core for a first revolution and a second portion that winds around the core for a second revolution, and each series connection connecting the first portion to the second portion of one of the multiple parallel paths.

2. The electric machine of claim 1 wherein each of the phase leads includes a terminal portion positioned radially outward from the semi-cylindrical space, an outer lead portion connected to an associated at least one outer lead, and an inner lead portion extending into the semi-cylindrical space and connected to an associated at least one inner lead.

3. The electric machine of claim 2 wherein the outer lead portion of each phase lead is connected to a radially outward side of the associated outer lead, and wherein the inner lead portion of each phase lead is connected to a radially outward side of the associated inner lead.

4. The electric machine of claim 1 wherein each series connection includes an outer axial leg aligned with one of the outer leads, an outer bend, circumferential portion, a radial portion, an inner bend, and an inner axial leg aligned with one of the inner leads.

5. The electric machine of claim 1 wherein each of a plurality of the series connections connects one of the inner leads to a directly opposite outer lead in a radial direction.

6. The electric machine of claim 1 further including at least one neutral connection, wherein the at least one neutral connection connects a plurality of the inner leads to a plurality of outer leads within the semi-cylindrical space and the at least one neutral connection includes a circumferentially extending plate, a plurality of outer legs aligned with the outer leads, and a plurality of inner legs aligned with the inner leads.

7. The electric machine of claim 1 wherein the bus bar assembly spans about 90° in a circumferential direction around the core.

8. The electric machine of claim 1 wherein the winding is defined by three phases and three slots per pole per phase.

9. The electric machine of claim 1, wherein the semi-cylindrical space is defined within a minor arc, and wherein each series connection includes an elongated cylindrical portion.

10. The electric machine of claim 9 wherein the minor arc is less than 150°, and the one end of the core is free of leads outside of the semi-cylindrical space.

11. An electric machine comprising:
    a stator assembly including a core with windings positioned on the core, the windings including inner leads and outer leads extending axially outward past end turns on one end of the stator assembly, the windings defining multiple winding phases, each winding phase including at least one first portion that winds around the core for a first revolution and at least one second portion that winds around the core for a second revolution; and
    a bus bar assembly connected to the inner leads and the outer leads, the bus bar assembly including a plurality of series connections, each of the series connections connecting the at least one first portion to the at least one second portion of said winding phase, and each of said series connections including a first end connected to an inner side of one of the outer leads and a second end connected to an outer side of one of the inner leads.

12. The electric machine of claim 11 wherein the inner leads and the outer leads define a semi-cylindrical space and each of the series connections is positioned within the semi-cylindrical space.

13. The electric machine of claim 12, the bus bar assembly further including a plurality of phase connections, each of the phase connections connected to at least one of the inner leads to at least one of the outer leads.

14. The electric machine of claim 13 wherein each of the phase connections includes a first leg connected to an outer side of one of the outer leads and a second leg connected to an outer side of one of the inner leads.

15. The electric machine of claim 13 wherein each of the phase connections includes a central portion that connects the first leg to the second leg, the central portion extending in a circumferential direction between the inner leads and the outer leads.

16. The electric machine of claim 13 wherein each of the phase connections includes a central portion that connects the first leg to the second leg, the central portion extending in a circumferential direction radially outward from the outer leads.

17. The electric machine of claim 11, the bus bar assembly further including at least one neutral connection, the at least one neutral connection including a plurality of outer legs connected to an inner side of a plurality of the outer leads and a plurality of inner legs connected to an outer side of a plurality of the inner leads.

18. An electric machine comprising:
a stator assembly including a core with windings, the windings comprising a plurality of winding paths wound on the core, the windings further comprising inner leads and outer leads extending axially outward past end turns on one end of the stator assembly with a semi-cylindrical space defined between the inner leads and the outer leads, wherein the semi-cylindrical space is defined within a minor arc, and the one end of the stator assembly is free of leads outside of the semi-cylindrical space; and
a bus bar assembly connected to the windings, the bus bar assembly including a plurality of connections extending within the semi-cylindrical space between the inner leads and the outer leads, each of the connections including an elongated circumferential portion positioned between the inner leads and the outer leads, wherein each of the connections provides a series connection for two of the plurality of winding paths.

19. The electric machine of claim 18 wherein the bus bar assembly further comprises a neutral connection arranged completely within the semi-cylindrical space, and a plurality of phase connections arranged partially within the semi-cylindrical space.

20. The electric machine of claim 19 wherein the plurality of series connections and the neutral connection reside entirely within the semi-cylindrical space.

\* \* \* \* \*